(12) United States Patent
Roehringer et al.

(10) Patent No.: US 6,808,039 B2
(45) Date of Patent: Oct. 26, 2004

(54) FRONT END OF A MOTOR VEHICLE

(75) Inventors: Arno Roehringer, Ditzingen (DE); Alfred Schnabel, Althengstett (DE); Rodolfo Schoeneburg, Hechingen (DE)

(73) Assignee: DaimlerChrysler AG, Stuttgart (DE)

( * ) Notice: Subject to any disclaimer, the term of this patent is extended or adjusted under 35 U.S.C. 154(b) by 110 days.

(21) Appl. No.: 10/274,228

(22) Filed: Oct. 18, 2002

(65) Prior Publication Data
US 2003/0075377 A1 Apr. 24, 2003

(30) Foreign Application Priority Data

Oct. 18, 2001 (DE) .......................................... 101 51 524

(51) Int. Cl.⁷ ............................. B60K 5/00; B62D 21/15
(52) U.S. Cl. ................ 180/312; 280/784; 280/124.109; 296/187.09
(58) Field of Search .......................... 280/784, 124.109, 280/93.515; 180/232, 312; 296/187.09, 193.09, 203.02

(56) References Cited

U.S. PATENT DOCUMENTS

| 5,492,193 A | * | 2/1996 | Guertler et al. ............. 280/784 |
| 6,099,039 A | | 8/2000 | Hine |
| 6,428,046 B1 | | 8/2002 | Kocer et al. |

FOREIGN PATENT DOCUMENTS

| DE | 195 47 491 | 3/1997 |
| DE | 42 30 669 | 10/1999 |
| EP | 0 677 436 | 10/1995 |
| EP | 0 714 824 | 6/1996 |
| JP | 05-185951 | 7/1993 |
| JP | 11-171046 | 6/1999 |
| JP | 2000-016327 | 1/2000 |
| JP | 2002-160663 | 6/2002 |
| JP | 2002-160664 | 6/2002 |

\* cited by examiner

Primary Examiner—Peter C. English
(74) Attorney, Agent, or Firm—Kenyon & Kenyon

(57) ABSTRACT

A front end of a motor vehicle, e.g., a passenger vehicle, having two longitudinal members, extending essentially parallel to the longitudinal direction of the vehicle, and an integral member on which a drive unit of the motor vehicle is mounted. The integral member has, on each side of the vehicle, a base member which extends essentially parallel to the longitudinal direction of the vehicle and is fastened in each case by a front supporting pillar and by a rear supporting pillar to one of the longitudinal members. Each longitudinal member being of deformable configuration in the longitudinal direction of the vehicle at least between the supporting pillars. In order to improve the deformation behavior of the front end, each base member is fastened exclusively via its front supporting pillar and its rear supporting pillar at the bottom to associated longitudinal members. Each base member is configured such that it has greater stiffness in the longitudinal direction of the vehicle than the respectively associated longitudinal member. The supporting pillars are configured and connected to the associated longitudinal member and/or to the associated base member such that they pivot about pivot axes extending essentially transversely with respect to the longitudinal direction of the vehicle, during a relative displacement between the base member and longitudinal member in the longitudinal direction of the vehicle.

11 Claims, 2 Drawing Sheets

FRONT END OF A MOTOR VEHICLE

FIELD OF THE INVENTION

The present invention relates to a front end of a motor vehicle, e.g., a passenger vehicle.

BACKGROUND INFORMATION

German Published Patent Application No. 195 47 491 describes such a front end of a passenger vehicle which has two longitudinal members extending essentially parallel to the longitudinal direction of the vehicle, and an integral member, a drive unit of the passenger vehicle being mounted on this integral member. The integral member has, on each side of the vehicle, a base member which extends essentially parallel to the longitudinal direction of the vehicle and is fastened in each case by a front supporting pillar and by a rear supporting pillar to one of the longitudinal members. In the case of the conventional front end, a central supporting pillar is also provided by which the base member is additionally fastened to the longitudinal member, between the front supporting pillar and the rear supporting pillar. The longitudinal members are of deformable design in the longitudinal direction of the vehicle at least between the front supporting pillar and the rear supporting pillar, that is, in the event of a crash, the longitudinal member can be deformed into zones provided for this purpose, in order thereby to absorb impact energy. By means of measures of this type, in the event of a crash the load on the vehicle occupants can be reduced, which increases their probability of survival.

It is an object of the present invention to provide a front end which may ensure an improvement in occupant safety.

SUMMARY

The above and other beneficial objects of the present invention are achieved by providing a front end of a motor vehicle as described herein.

The present invention is based on the concept of coupling the integral member to the longitudinal members so that it may be displaced in the longitudinal direction of the vehicle relative to them in the event of a crash. This measure means that the integral member does not reinforce the deformable zones of the longitudinal member, so that the energy-absorbing effect thereof may be deployed essentially unhindered. The displaceability of the integral member may also result in displaceability of the components connected thereto, such as, for example, the drive unit, as a result of which the zone provided for the deformation, the so-called "crumple zone", may be of larger dimensions in the longitudinal direction of the vehicle.

In the case of the present invention, this sought after pivotability or displaceability of the integral member may be achieved by its base member being of particularly dimensionally stable configuration with regard to the longitudinal direction of the vehicle and thereby having a greater stiffness than the respectively associated longitudinal member. Furthermore, each base member is connected only via its front supporting pillar and via its rear supporting pillar to the associated longitudinal member. In the event of a crash, a frontal loading of the front end therefore has the effect that the longitudinal members are deformed in the longitudinal direction of the vehicle and that the base members are displaced to the rear together with the assemblies and components connected thereto, the supporting pillars failing or being deformed so that a pivoting movement about pivot axes extending essentially transversely with respect to the longitudinal direction of the vehicle is produced for the supporting pillars. This pivoting adjustment of the supporting pillars may enable virtually parallel adjustment or displacement of the base members to the rear. The two base members are usually connected to each other via cross members and therefore form a supporting frame on which the abovementioned assemblies or components of the engine compartment are fixed. Accordingly, the integral member together with the assemblies and components connected thereto forms a unit which may move essentially in its entirety to the rear in the event of a crash.

According to one example embodiment of the present invention, the vehicle frame of the vehicle is configured in the region of the integral member so that each rear supporting pillar has, to the rear in the longitudinal direction of the vehicle, a clearance as far as the vehicle frame. This manner of construction may also ensure the displaceability of the base members on the frame side.

In an example embodiment of the present invention, a front bearing and a rear bearing for a transverse link of a front wheel may be formed on each base member. Transverse links of this type are particularly dimensionally stable, as a result of which the stability of the respective base member may be significantly increased by the transverse link mounted thereon. This manner of construction therefore supports the manner of action intended by the present invention of being able to adjust the integral member to the rear in the region of the base members in a virtually undeformed manner in the event of a crash.

The front bearing may be arranged below the front supporting pillar and the rear bearing may be arranged below the rear supporting pillar, as a result of which, in the event of a crash, the base member may be pivoted in a guided manner in the region of its maximum stiffness by the connection to the supporting pillars.

According to an example embodiment of the present invention, in the case of a vehicle having drivable front wheels, a three-way driving connection may be implemented by the drive unit between the supporting pillars and between the base member and longitudinal member to the respective front wheel. The three-way driving connection includes an articulated shaft which leads from a gear mechanism of the drive unit to the front wheel. By the selected arrangement of the three-way driving connection, in particular if the latter is positioned in the vicinity of the rear supporting pillar, in the event of a crash a disadvantageous collision of the three-way driving connection with a supporting pillar may be avoided.

If, in the case of an example embodiment of the motor vehicle, a steering rod is arranged behind the rear supporting pillars, in an example further development, the steering rod may have, to the rear in the longitudinal direction of the vehicle, a clearance as far as the vehicle frame, as a result of which in the event of a crash the steering rod may be moved along by the displacing integral member.

Further features and aspects of the present invention are explained below with reference to the drawings and to the associated description of the figures with reference to the drawings.

The features which are mentioned above and those which are yet to be explained below may be used not only in the respectively stated combination, but also in other combinations or on their own without departing from the scope of the present invention.

An exemplary embodiment of the present invention is illustrated in the drawings and will be explained in greater detail in the following description.

DETAILED DESCRIPTION

Figure 1:
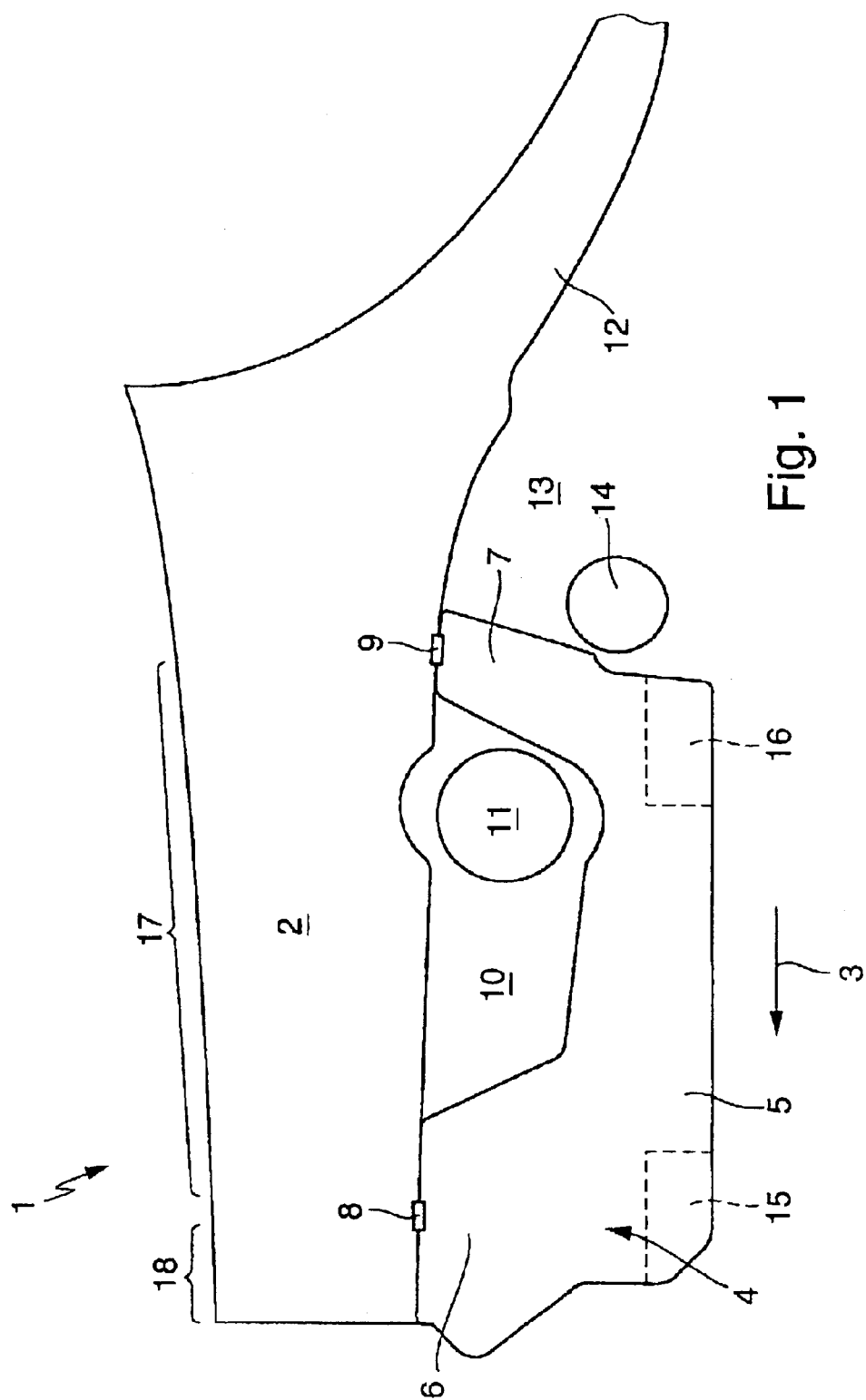
FIG. 1 is a schematic side view of a front end according to the present invention in an undeformed state.
Figure 2:
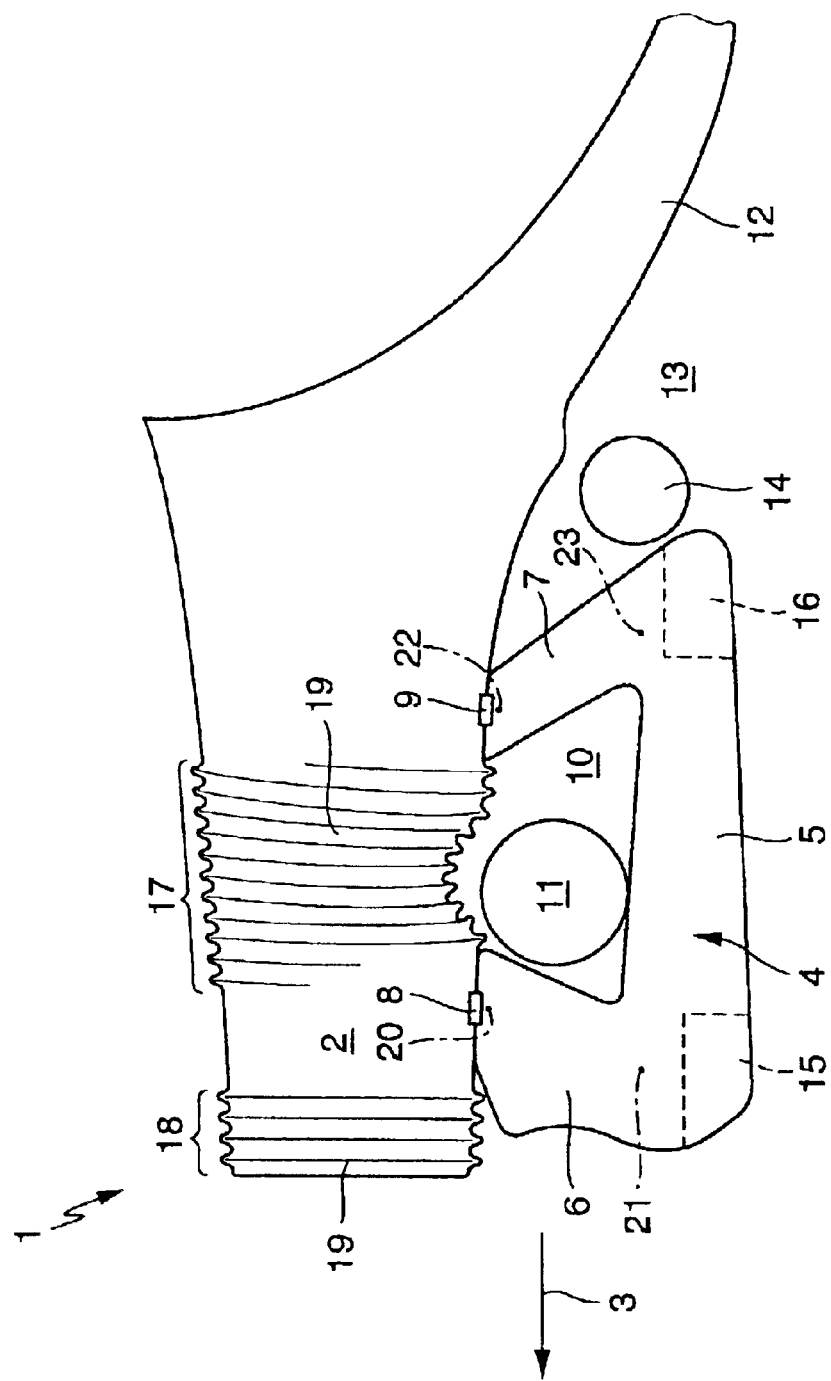
FIG. 2 is a schematic side view as in FIG. 1, but in a deformed state.

According to FIGS. 1 and 2, a front end 1 of a motor vehicle, in particular of a passenger vehicle, has, on each side of the vehicle, a longitudinal member 2 which extends essentially parallel to a longitudinal direction 3 of the vehicle, which is indicated by an arrow. An integral member 4 which extends essentially over the entire width of the vehicle is arranged below the longitudinal members 2. The integral member 4 has, on each side of the vehicle, a base member 5 which extends essentially parallel to the longitudinal direction 3 of the vehicle at a vertical distance from the associated longitudinal member 2. The two base members 5 are usually connected fixedly to each other via cross members and thereby form a supporting frame on which various assemblies and components of the vehicle are mounted. For example, a drive unit of the motor vehicle is mounted on this supporting frame, for example via corresponding engine bearings.

Each base member 5 is connected fixedly to the associated longitudinal member 2 via a front supporting pillar 6 and via a rear supporting pillar 7. The corresponding connecting points are referred to with reference characters 8 and 9 and are in each case only illustrated symbolically. In the undeformed state illustrated in FIG. 1, the front supporting pillar 6 has an inclination directed forward, while the rear supporting pillar 7 is inclined to the rear from the base member 5. Formed between the supporting pillars 6 and 7 and between the longitudinal member 2 and the base member 5 is an aperture 10 in which a three-way driving connection 11 is guided through from the inside to the outside in order thus to connect the drive unit to a driven front wheel. The three-way driving connection 11 is positioned in the aperture 10 in the vicinity of the rear supporting pillar 7.

Furthermore, a vehicle frame 12 is arranged so that a clearance 13 is formed between the rear supporting pillar 7 and the vehicle frame 12 in the longitudinal direction 3 of the vehicle. In this clearance 13, a steering rod 14, which forms part of a vehicle steering system is arranged in the vicinity of the rear supporting pillars 7.

In the case of the example embodiment illustrated, each base member 5 has a front bearing 15 below the front supporting pillar 6 and a rear bearing 16 below the rear supporting pillar. The two bearings 15 and 16 serve for the mounting of a transverse link of the front wheel. A transverse link of this type is usually configured as a component of high stiffness which is virtually undeformable in the context of conventional crash cases.

Each longitudinal member 2 is configured, at least in a section 17 which extends between the supporting pillars 6 and 7, so that it is deformed in the longitudinal direction 3 of the vehicle in the event of a crash. The longitudinal member 2 illustrated is also configured so that it may be deformed in the longitudinal direction 3 of the vehicle in a front region 18.

According to the present invention, each base member 5 is configured so that it has greater stiffness in the longitudinal direction 3 of the vehicle than the respectively associated longitudinal member 2.

In the event of a frontal impact of the vehicle against an obstacle, a frontal action of force occurs which, as illustrated in FIG. 2, causes a deformation of the sections 17 and 18 of the longitudinal member 2 in the longitudinal direction 3 of the vehicle. In the process, the length of the longitudinal member 2, as measured in the longitudinal direction 3 of the vehicle, is shortened. A corresponding wrinkling 19, which occurs in the deformation zones 17 and 18 in the event of a crash, is illustrated symbolically in FIG. 2. By the deformable section 17, which is arranged between the supporting pillars 6 and 7, the distance between the fastening points 8 and 9, at which the supporting pillars 6 and 7 are connected fixedly to the longitudinal member 2, decreases in accordance with the deformation. In addition, the effective forces cause the integral member 4 and its supporting frame together with the base members 5 to be displaced to the rear parallel to itself. The high stiffness of the base members 5, which may be supported by the stiff cross members ensure that the base members 5 and, therefore, the supporting frame are essentially not deformed. In particular, the assemblies and components articulated on the supporting frame and on the integral member 4 may be displaced to the rear at the same time.

Of particular importance in this connection may be the configuration of the supporting pillars 6 and 7 which are of deformable configuration in the region of their connection to the longitudinal members 2 and in the region of their connection to the respective base member 5 so that in the course of the crash the supporting pillars 6 and 7 may carry out pivoting movements about pivot axes which extend transversely to the longitudinal direction 3 of the vehicle and extend through the respective connecting points of the supporting pillars 6 and 7. The respective pivot axes are illustrated symbolically in FIG. 2 and are referred to with reference characters 20, 21, 22 and 23.

As illustrated in FIG. 2, after the crash the front supporting pillar 6 therefore has an inclination which is directed to the rear with regard to the base member 5. That is, by the crash, the upper end of the front supporting pillar 6 has moved to the rear past the lower end of the front supporting pillar 6. In a corresponding manner, during the crash the lower end of the rear supporting pillar 7 has moved to the rear past the upper end of the rear supporting pillar 7, so that after the crash the rear supporting pillar 7 has a forwardly directed inclination with regard to the base member 5. By the crash, a lower end of the base member 5 has penetrated into the clearance 13, in which case the displacing integral member 4 has, if appropriate, moved the steering rod 14 at the same time.

In contrast to this, the three-way driving connection 11 may—because of its connection—remain relatively fixed in position with regard to the longitudinal member 2 in the event of a crash. By the arrangement of this three-way driving connection 11 in the aperture 10 in the vicinity of the rear supporting pillar 7, the integral member 4 may be displaced to the rear relative to the three-way driving connection 11 without a collision between the integral member 4 and three-way driving connection 11 occurring. Accordingly, the profile of the decelerations acting on the vehicle in the event of a crash has a characteristic curve which is favorable for the passengers.

FIG. 2 illustrates that even after the crash the integral member 4 is essentially undeformed in the region of its base member 5, so that it may be ensured with relatively high certainty that the components and assemblies connected to the integral member 4 are adjusted to the rear at the same time in the event of a crash and thereby permit a relatively great deformation of the longitudinal member 2 in order to absorb energy.

Since no further supporting pillar or the like is arranged between the front supporting pillar 6 and the rear supporting pillar 7, the aperture 10 has a relatively large size, as a result of which the components, such as, for example, the three-way driving connections 11, protruding through this aperture 10 have a relatively large displacement path.

What is claimed is:

1. A front end of a motor vehicle, comprising:

two longitudinal members extending essentially parallel to a longitudinal direction of the vehicle; and an integral member configured to mount a drive unit of the vehicle, the integral member including a base member arranged on each side of the vehicle, each base member fastened exclusively by a front supporting pillar and a rear supporting pillar to a bottom of one of the longitudinal members, the longitudinal members deformable in the longitudinal direction of the vehicle at least between the front supporting pillars and the rear supporting pillars, each base member having a greater stiffness in the longitudinal direction of the vehicle than the respective longitudinal member, the supporting pillars configured and connected to at least one of the respective longitudinal member and the respective base member to deform about pivot axes extending essentially transversely with respect to the longitudinal direction of the vehicle during relative displacement between the respective base member and the respective longitudinal member in the longitudinal direction of the vehicle.

2. The front end according to claim 1, wherein the motor vehicle includes a passenger vehicle.

3. The front end according to claim 1, wherein a clearance is located between each rear supporting pillar and a vehicle frame rearwardly in the longitudinal direction of the vehicle.

4. The front end according to claim 1, wherein each base member includes a front bearing and a rear bearing of a transverse link of a front wheel.

5. The front end according to claim 4, wherein each front bearing is arranged below the respective front supporting pillar and each rear bearing is arranged below the respective rear supporting pillar.

6. The front end according to claim 1, wherein the drive unit includes a three-way driving connection that extends between the supporting pillars and between the base members and longitudinal members to drivable front wheels.

7. The front end according to claim 6, wherein the three-way driving connection is arranged in a vicinity of the rear supporting pillars.

8. The front end according to claim 1, wherein a steering rod is arranged behind the rear supporting pillars with a clearance rearwardly formed between the rear supporting pillars and a vehicle frame.

9. The front end according to claim 1, wherein an upper end of the supporting pillars are directly connected to the respective longitudinal member and the supporting pillars are configured to deform about pivot axis points of connection between the supporting pillars and the respective longitudinal member.

10. The front end according to claim 9, wherein the supporting pillars are further configured to deform about pivot axis points of connection between the supporting pillars and the respective base member.

11. The front end according to claim 1, wherein the supporting pillars are configured and connected to the respective longitudinal member and the respective base member to deform about the pivot axes extending essentially transversely with respect to the longitudinal direction of the vehicle during the relative displacement between the respective base member and the respective longitudinal member in the longitudinal direction of the vehicle.

* * * * *